United States Patent [19]
Taub et al.

[11] Patent Number: 5,517,981
[45] Date of Patent: May 21, 1996

[54] WATER-ACTIVATED CHEMICAL HEATER WITH SUPPRESSED HYDROGEN

[75] Inventors: Irwin A. Taub, Framingham; Kenneth Kustin, Cambridge, both of Mass.

[73] Assignee: The United States of America as represented by the Secretary of the Army, Washington, D.C.

[21] Appl. No.: 263,287

[22] Filed: Jun. 21, 1994

[51] Int. Cl.$^6$ .................................................. F24J 1/00
[52] U.S. Cl. .................. 126/263.01; 126/263.09; 126/246; 126/263.08; 426/407; 426/113; 44/251
[58] Field of Search .................. 126/262, 263.01, 126/263.05, 263.07, 263.06, 263.09, 263.08, 246; 426/109, 113, 114, 407; 44/250, 251

[56] References Cited

U.S. PATENT DOCUMENTS

| | | | |
|---|---|---|---|
| 3,913,559 | 10/1975 | Dandliker | 126/263.07 |
| 4,013,061 | 3/1977 | Trumble et al. | 126/263.01 |
| 4,043,314 | 8/1977 | Trumble et al. | 126/263.01 |
| 4,649,895 | 3/1987 | Yasuki | 126/263.05 |
| 5,220,909 | 6/1993 | Pickard | 126/263.08 |
| 5,366,869 | 10/1994 | Pickard | 126/263.01 |

*Primary Examiner*—James C. Yeung
*Attorney, Agent, or Firm*—John H. Lamming; Vincent J. Ranucci

[57] ABSTRACT

Flameless chemical heaters based on the iron-promoted magnesium-water reaction ($Mg+H_2O \rightarrow Mg(OH)_2+H_2$) are reliable and potentially useful. The major limitation to their widespread application is the cogeneration of flammable dihydrogen gas in this reaction. The invention is a new chemical composition that removes this drawback by producing a controlled surge of heat without the release of large quantities of dangerous dihydrogen gas. The release of $H_2$ gas is avoided by completely or almost completely suppressing $H_2$ creation rather than by removing $H_2$ after it is created. The reagents that suppress dihydrogen gas generation react with and remove (i.e., scavenge) precursors of $H_2$ such as aquated electrons and H-atoms. The overall heat-generating reactions of the invention, for example, $Mg+CuCl_2 \rightarrow Mg^{2+} +2Cl^-+Cu^0$ release more heat per unit weight of magnesium than the $Mg-H_2O$ reaction; in this case, approximately 70% more heat. Flameless chemical heaters using iron-promoted magnesium with various scavengers of $H_2$ precursors can be formulated for diverse and safe applications, especially where numerous rations or medical supplies are to be heated in confined spaces such as cockpits, tents, and underwater shelters, without concern for explosion or fire.

14 Claims, 7 Drawing Sheets

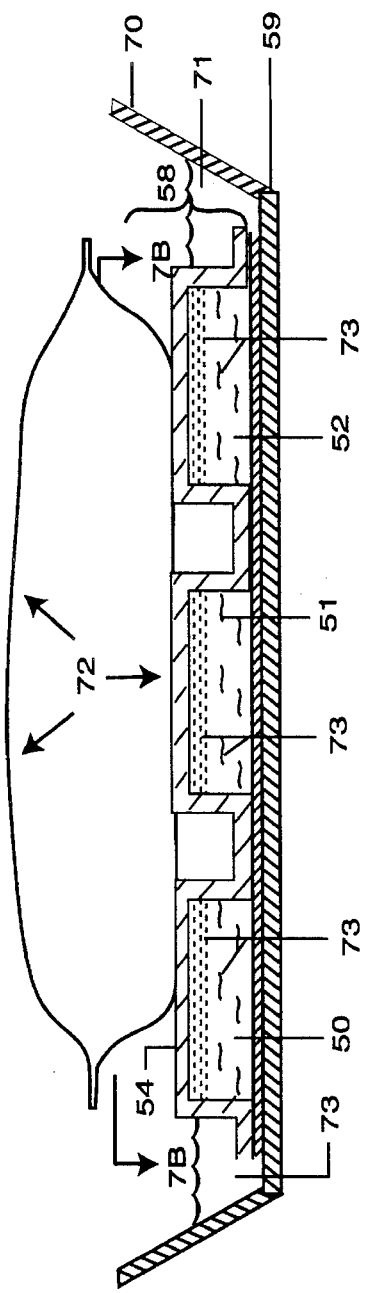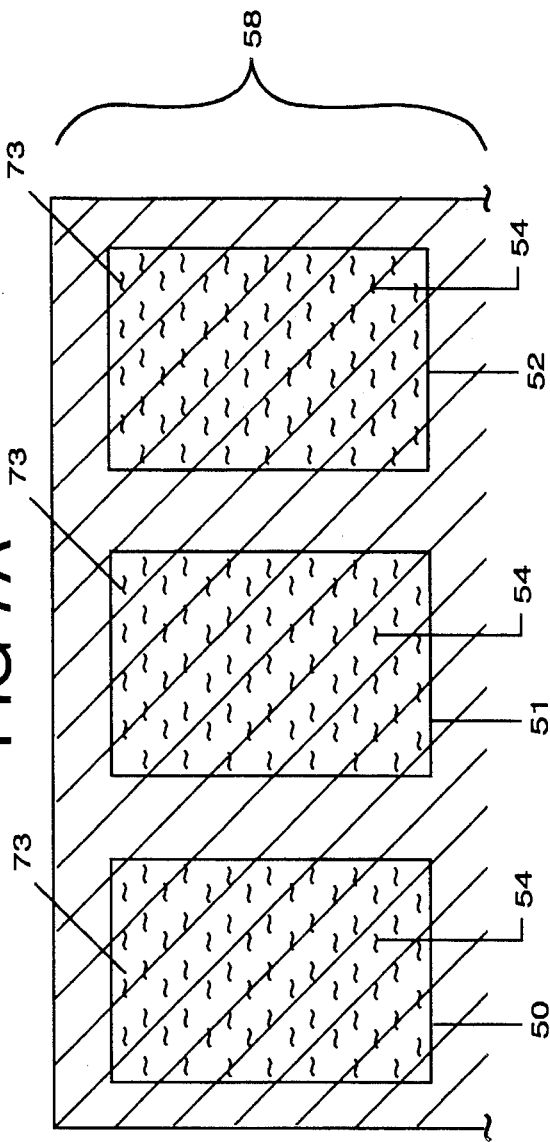

WATER-ACTIVATED CHEMICAL HEATER WITH SUPPRESSED HYDROGEN

FIELD OF INVENTION

The invention described herein manufactured, used, and licensed by or for the Government for Governmental purposes without the payment to us of any royalty thereon. The invention relates to chemical heating devices, particularly those useful in heating packaged food or small quantities of food designed for immediate consumption. The invention was developed jointly by the United States Army and Brandeis University using government funds.

BACKGROUND OF INVENTION

There is a recognized need for a safe, ecologically sound, reliable flameless heater, especially for foods. For campers, such flameless heating avoids the risks of a campfire. In military maneuvers, the avoidance of visible detection by an enemy is enhanced by the use of flameless heat.

One class of heating devices that meets such a need is based on short-circuited electrochemical cells (Gilman and Bramhall, 1978). In these devices, anode and cathode compartment reactions of actual or theoretical electrochemical cells are combined together, capturing as heat the energy from the overall net cell reaction. Such devices have been patented (Epstein, 1970; Kober, 1978), but difficulties with manufacturing procedures, poor storage capability, and a lack of flexibility in matching heater configuration and geometry with, for example, food container geometry have limited their use. An electrochemical heater based on the magnesium-water reaction that eliminates these problems has been patented (Kuhn et al., 1983) and applied with success; for example, as a flameless ration heater (FRH) used by the U.S. Army.

A talk co-authored by K. Kustin, W. Roberts, and I. A. Taub, and presented by K. Kustin at the American Chemical Society National Meeting in New York on Aug. 30, 1991 dealt with the mechanism of the iron-promoted magnesium-water reaction. The theme of this presentation was to explain the roles of iron and chloride ions in relation to the protective nature of the magnesium hydroxide surface coating. Two aspects of the dynamics of dihydrogen gas generation were mentioned. First was that its evolution fits first-order kinetics. Second was that its rate constant was close but not equal to the first-order temperature-evolution rate constant. It was not discussed or presented during this presentation that there were scavengeable molecular hydrogen precursors in solution.

The Kuhn et al. (1983) device uses the iron-promoted reaction between magnesium metal and water that is catalyzed by certain dissolved electrolytes, for example, NaCl. The combination of magnesium and iron, referred to as a "super corroding metallic alloy" consists of a mixture approximately five moles of iron to ninety-five moles of magnesium (5:95 iron:magnesium) blended by a metallurgical milling technique. A drawback of the device is that, simultaneously with generation of heat, flammable dihydrogen gas is generated.

In their invention, Kuhn et al. (1983) considered the hazardous aspects of $H_2$ evolution and demonstrated that, for small packages, the gas could not be ignited with an open flame and spark. The device was therefore judged to be safe. Kuhn et al. (1983) admitted, however, that the generation of dihydrogen can be a problem under certain circumstances. They suggested that the gas, once formed, could be removed catalytically, for example, in the presence of a palladium-based catalyst by the reaction:

$$2H_2 + O_2 = 2H_2O + Heat$$

It should be noted that the Kuhn device does not teach the suppression of hydrogen formation, but attacks the problem of undesired hydrogen by removing it with additional reactions after its formation.

It is appropriate to consider the practicality of this suggestion for a typical application in which 60 ml of water has been added to a heater pad. As a result of the magnesium-water reaction, after the brief (5–10 min) heating period, the remaining solution is warmed, typically, to 80° C. From tables of solubility data (Linke, 1956), the maximum concentrations of the two gases at this temperature would be approximately $8 \times 10^{-4}$M dissolved $O_2$ and $4 \times 10^{-4}$M dissolved $H_2$ at 1 atmosphere (atm) total pressure. The total pressure in contact with the heated solution would be due almost entirely to water vapor and $H_2$ gas. Therefore, the estimated dissolved concentration is reasonable for dihydrogen. Dissolved dioxygen, however, is in contact with very little $O_2$ gas, and its concentration would be expected to be one or two orders of magnitude lower than the estimate derived from tabulated solubility data.

Based on this assessment of conditions in the heater subsequent to addition of water, it is clear that at least two considerations make the proposed catalytic suppression of dihydrogen evolution as in Kuhn, et al, impractical. First is that insufficient dissolved $O_2$ is present in the reaction mixture to combine with and remove $H_2$. Catalytic action therefore requires dissolution of atmospheric dioxygen to react with the evolving $H_2$. Mass transport of $O_2$ from the atmosphere is not rapid (Patwardhan and Sharma, 1988) and is unlikely to raise the dioxygen concentration to a value sufficiently high to remove dihydrogen formed during the relatively short heating period. Second is that catalysis by palladium or silver is not rapid (Engel and Kuipers, 1979). Little combination of $H_2$ with $O_2$ would be expected to occur during the heating period through the agency of such catalysts.

It can be seen that there presently is not a way to provide such chemical heating that does not, to some degree, expose the surrounding atmosphere to free dihydrogen gas. It would be helpful to devise a method to suppress $H_2$ formation that could be applied to a variety of heating applications. In particular, it would be helpful to devise a means of accomplishing such chemical heating that could be applied to food in quantities sufficient to feed from one to forty or so individuals as may be appropriate in military field environments.

SUMMARY OF INVENTION

The present invention avoids the danger of the release of dihydrogen gas during the process of chemical heating by suppressing the creation of hydrogen rather than reacting with the dihydrogen gas upon its creation or release.

The invention teaches a combination of, and methods of combining, groups of chemicals which will, in the presence of a controlled release of water, provide heat sufficient to heat ordinary food products without releasing dihydrogen ($H_2$) gas.

The invention also teaches specific chemical combinations and methods of achieving such reactions for safely heating pouched, or otherwise contained, items such as foods, medical compresses, blood, or blood plasma. Upon addition of a specified amount of water, the iron-promoted, sodium chloride-catalyzed, magnesium-water reaction ensues, producing a controlled surge of heat. The present invention allows this reaction to occur while suppressing dihydrogen gas, an undesirable byproduct. The invention is a chemical combination of blended iron-magnesium powder, sodium chloride, and specific reagents that react with electrons (unsolvated or solvated) or hydrogen atoms.

Finally, the invention teaches how the combinations, methods, and principles revealed herein may be applied to presently known heating apparatus in order to accomplish specific heating tasks. While two such apparatus will be depicted, it will readily be seen by one of ordinary skill in the art that the chemical compositions taught herein may be adapted to a variety of devices presently known.

It is, then, an object of the present invention to provide a method for achieving chemical heating while avoiding the formation of dihydrogen gas during the process.

It is a further object of the present invention to provide a means of applying such a method to heat appropriate quantities of packaged or consumable food.

It is a further object of the present invention to demonstrate the involvement of precursors of dihydrogen gas, to identify reagents highly reactive to these precursors, and to use such reagents as scavengers to suppress the formation of dihydrogen gas during chemical heating reactions.

It is a further object of the present invention to provide apparatus useful in exploiting the principles of the presently taught chemical process for the heating of quantities of food.

Other features and advantages of the present invention will be apparent from the following description in which the preferred embodiments have been set forth in conjunction with the accompanying drawings.

BRIEF DESCRIPTION OF THE DRAWINGS

In describing the preferred embodiments of the invention reference will be made to the series of figures and drawings briefly described below.

FIG. 7 depicts a cross-section of apparatus useful in exploiting the principles of the present invention to heat larger portions of food, for instance a multi-serving container.

DETAILED DESCRIPTION OF THE PREFERRED EMBODIMENT

Figure 1:
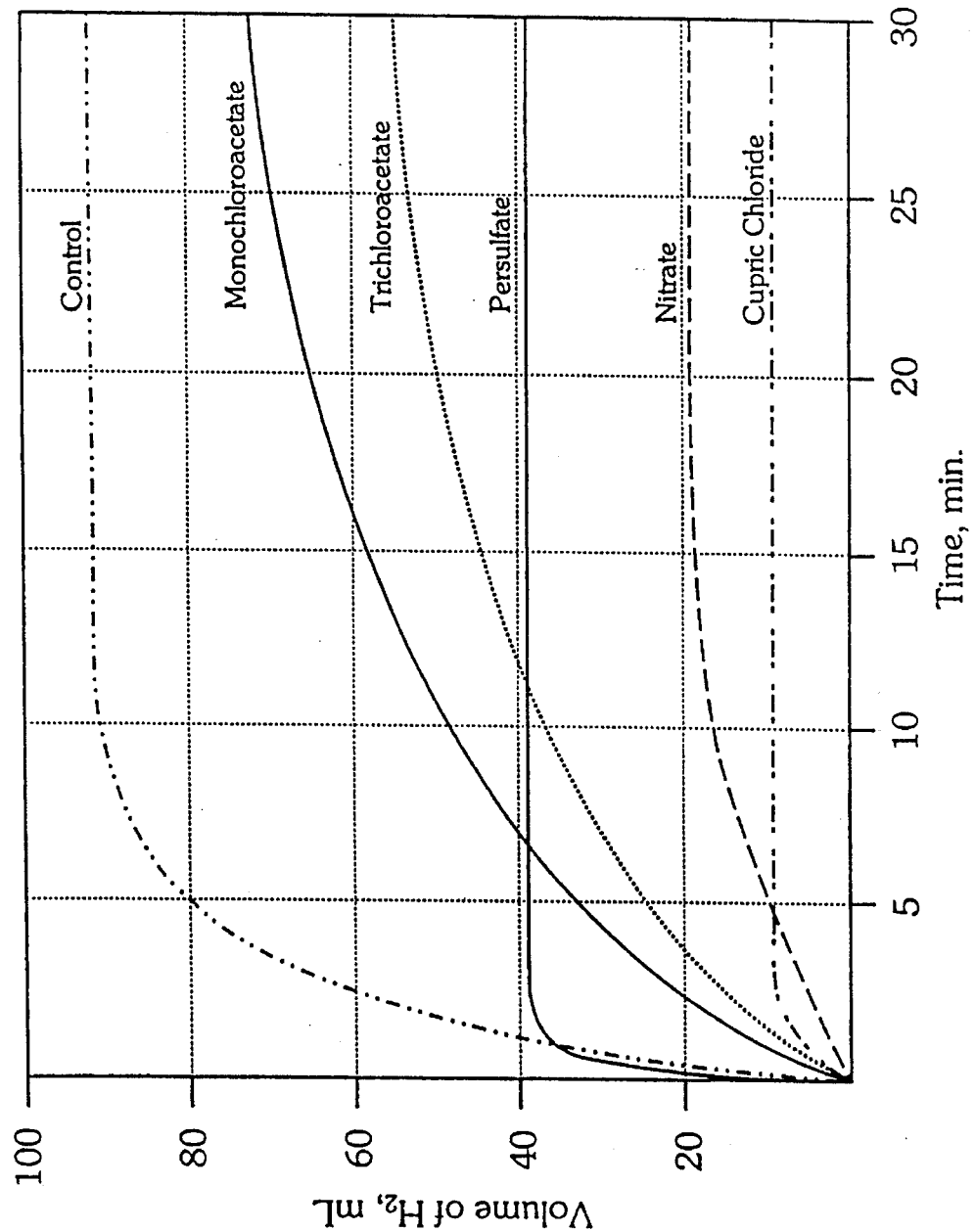
FIG. 1 depicts a graph of the formation of dihydrogen as a function of time in the absence and presence of representative scavengers.

Reference will now be made in detail to the present preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined in the appended claims.

The invention consists of a new chemical composition that, upon reaction with water, produces a controlled surge of heat with complete or almost complete suppression of the concomitant evolution of $H_2$. Several chemical heating compositions can be formulated that generate heat and suppress the formation of hydrogen upon mixing with the magnesium-iron powder configured with or without a supporting high-density polyethylene matrix (FIGS. 6 and 7) and placed in one of several application systems. These compositions are chosen to ensure that the activating solution has a stoichiometric excess of the suppressants at high enough concentration to scavenge the precursors of the molecular hydrogen.

Thought most likely to be present in the reaction mixture is the H-atom, H., clearly a molecular hydrogen precursor. Thought less likely to be present, other than for a very short duration, was the solvated (in this case, aquated) electron, $e_{aq}^-$, which could also serve as a molecular hydrogen precursor. Thought even less likely was the more mobile and incompletely-solvated "dry electron," which serves as a precursor of $e_{aq}^-$. Experiments with selected known scavengers of H-atoms and solvated electrons showed dramatic reductions in the volume of $H_2$ gas generated. Further experiments with addition of combinations of scavengers to the iron-promoted magnesium-water reaction were undertaken to refine the mechanism so that scavenger effectiveness can be determined and ultimately predicted.

The magnesium-water reaction, which is the basis for the heating and is thermodynamically favored, is sluggish at ambient temperature, because of unfavorable kinetics. This sluggishness is due to the surface coating of $Mg(OH)_2$ and MgO, which shields the magnesium metal surface from contact with liquid water. However, the hydroxide/oxide shield is not as impregnable as that afforded by $Al_2O_3$ on metallic aluminum surfaces. The magnesium hydroxide/oxide coating is not tightly bound and does not have significant structural integrity.

Numerous fissures and channels permeate the coating and eventually allow contact between magnesium metal surface and water. The role of chloride ion as a catalyst to hasten this permeation process is well known. Because species such as Mg(OH)Cl form in the presence of chloride ion (Brossard and Piron, 1980), the coating structure is weakened, allowing rapid penetration of the coating by water. A further feature of the coating that facilitates reaction is the presence of magnesium atom clusters detached from the bulk of the metal that lodge in the coating (Brossard and Piron, 1980). Reaction of these magnesium atoms with water at or close to the metal surface contributes to further deterioration of the protective coating.

For some time it has been known that traces of impurity metals such as iron, cobalt, and zinc in magnesium can promote its reaction with water (Raynor, 1959). The role of iron and the mechanism of the overall reaction have not been clarified (Perrault, 1973) in the prior art. The present invention exploits the development of such a mechanism as a consequence of the dynamical studies conducted on this reaction. It is consistent with several key observations. The first is that the reaction proceeds in the absence of dissolved $O_2$. Second is the observation of the consumption of a very slight amount of iron during the course of the reaction (10–20 min.). This iron is converted to ferric ion; no ferrous ion could be detected. Finally, it is seen that first-order evolution of both heat (as measured by temperature rise in a calorimeter) and an amount of $H_2(g)$ results from this process. This leads to an increase of rate of reaction with increasing sodium chloride concentration ([NaCl]) over the range 0–1.0M, which then levels off at higher concentrations.

To interpret these observations, it is postulated that the role of iron is to bring the magnesium into a more reactive state by providing a source of surface active H-atoms. The H-atom activates the magnesium, which begins to react by H-atom, hydride ion, and electron transfer pathways. Once the protective coating is breached, the reaction is self-sustaining. Both interfacial and solution phase electrons and H-atoms generated during the course of the reaction act as precursors of molecular hydrogen, two such precursors needed to produce one molecule of $H_2$. We further postulate that if sufficiently high concentrations of reagents highly reactive towards these precursors are present near the Mg-$H_2O$ interface, then the formation of molecular hydrogen can be suppressed.

This novel mechanism has not been evident to practitioners of electrochemical arts and sciences, who have not offered a satisfactory explanation of, for example, the well-known inefficiency and hazard of Mg-$MnO_2$ cells because of $H_2$ evolution during discharge (Gilman and Bramhall, 1978), despite the protection afforded by the oxide layer and the knowledge that the direct Mg-$H_2O$ reaction is so slow (Cotton and Wilkinson, 1988). In contrast to the current understanding of the art and practice of electrochemical technology, the present approach to solving the problem of dihydrogen gas generation is based on an understanding of the mechanism of the overall reaction. Simply stated, it is to add to the heater composition compounds that scavenge the precursors.

The scavengers intentionally included in the chemical combination fall into three categories: electron scavengers, H-atom scavengers, and scavengers of both electrons and H-atoms. They are effective in scavenging these precursors and suppressing the formation of dihydrogen because their corresponding reaction rate constants are high and because the reactions do not yield products that include dihydrogen. Their effectiveness in suppressing dihydrogen formation while generating as much, if not more, heat can be best appreciated by reference to FIGS. 1–5, which summarize the salient data.

A plot of the formation of dihydrogen as a function of time in the absence and presence of representative scavengers is shown in FIG. 1. The curve marked "control" represents the results for the activating solution containing no scavengers but having [NaCl] of 2M. For a given amount of Mg/Fe mixture of 100 mg, the control reaction leads to an expected maximum $H_2$ yield of 93 ml. The curve for the electron scavenger, persulfate ($S_2O_8^{2-}$), shows a significant reduction when $[S_2O_8^{2-}]=1M$. The curve for monochloroacetate ion, which is a good electron scavenger but only a fair H-atom scavenger, similarly shows a significant reduction.

When trichloroacetate ion (TCA$^-$) is used, which has three susceptible chlorine atoms, an even greater reduction in $H_2$ yield is obtained compared with monochloroacetate at the same concentration. The greater effectiveness of the TCA$^-$ is a key fact in ascribing the suppression to the presence of $e^-_{aq}$ and to its scavengeability at high solute concentrations. The curve for nitrate ion ($NO_3^-$), which readily scavenges $e^-_{aq}$ and has a moderate affinity for H-atom, shows a substantially reduced $H_2$ yield and indicates that $NO_3^-$ reacts with $e^-_{aq}$ and possibly with H-atom. The curve for cupric ($Cu^{2+}$) chloride is particularly instructive because the $H_2$ yield is substantially reduced and $Cu^{2+}$ is known to be an excellent scavenger of both electrons and H-atoms. Similar curves for other scavengers have been obtained that can be understood by this consistent interpretation.

Figure 2:
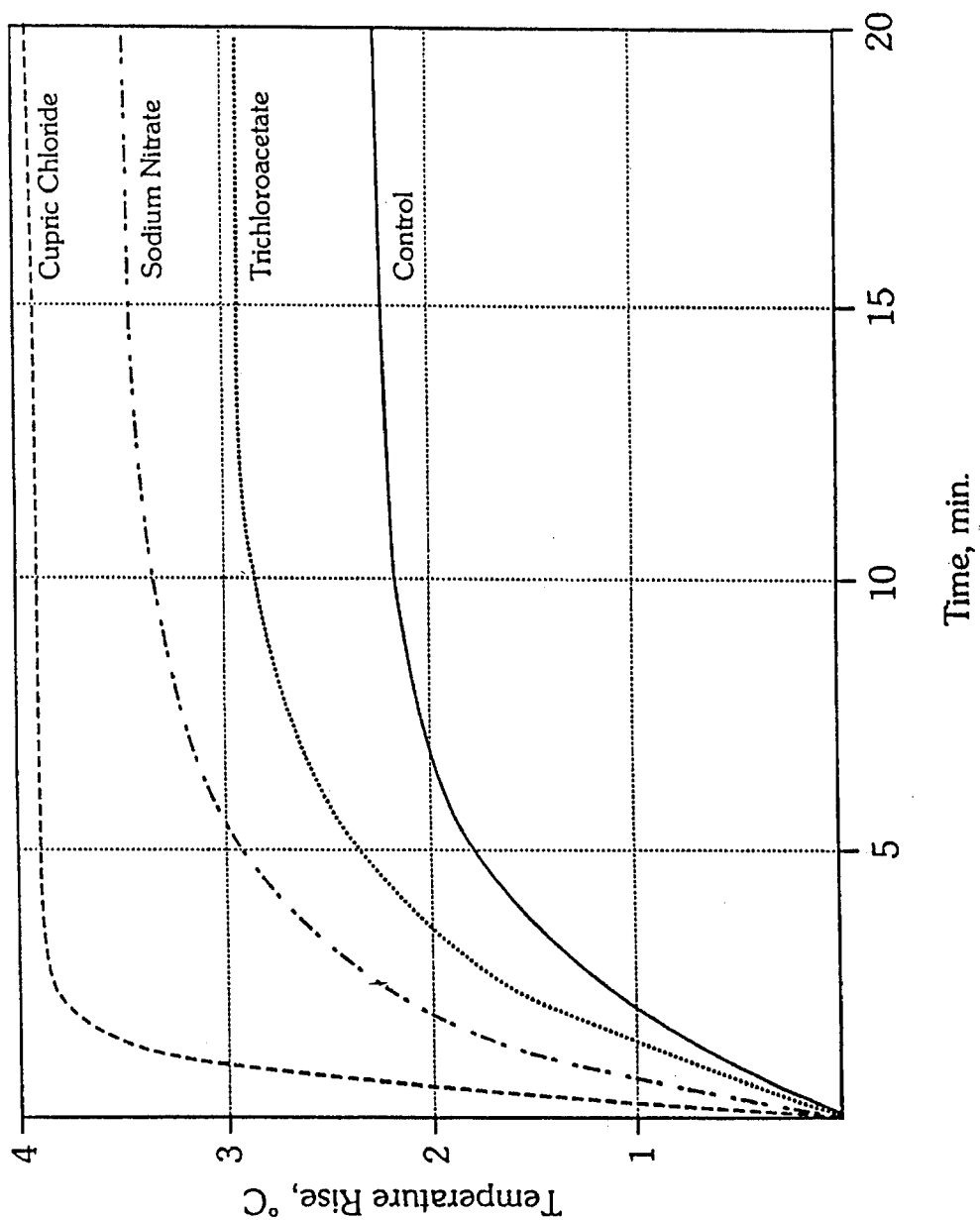
FIG. 2 depicts the changes in temperature over time for various chemical scavengers used according to the present invention.

A plot of the temperature rise as a function of time, which reflects the rate and extent of heat generation, is shown in FIG. 2 for several representative scavengers, all at comparable reductions in $H_2$ yield. These results clearly indicate that the overall reaction in each case, starting with the scavenging of the precursors and leading to the formation of final products, generates more heat than the control. The reaction of cupric chloride with precursors, which leads to cuprous ion ($Cu^+$) or elemental copper ($Cu^0$), generates 70% more heat than the control. Accordingly, a proportionately lesser amount of Mg/Fe mixture could be used to achieve the same heating effect, while producing even less $H_2$. All of the scavengers investigated generated at least as much heat as the control and many generated considerably more.

Figure 3:
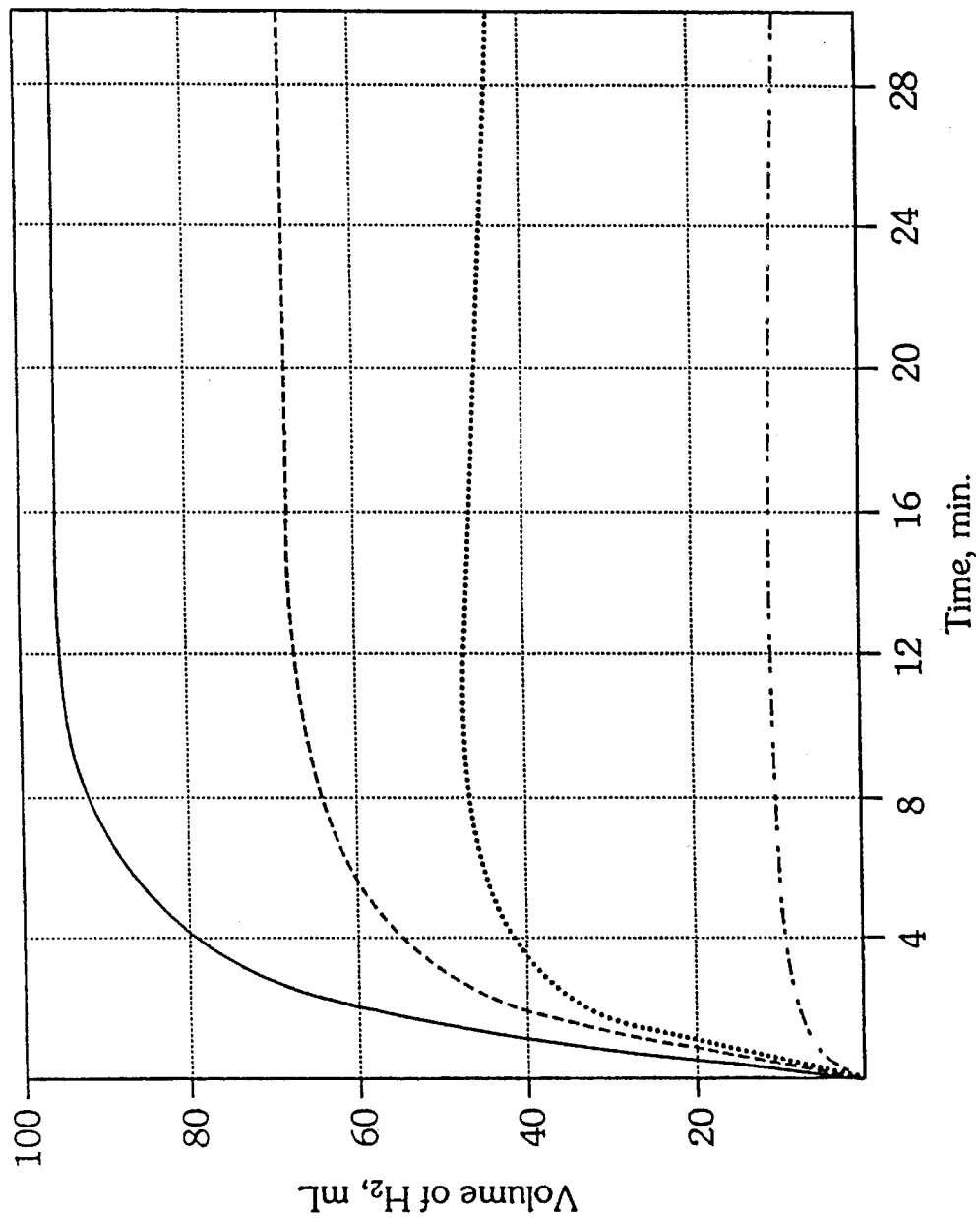
FIG. 3 depicts the production of $H_2$ over time for such chemical scavengers.
Figure 4:
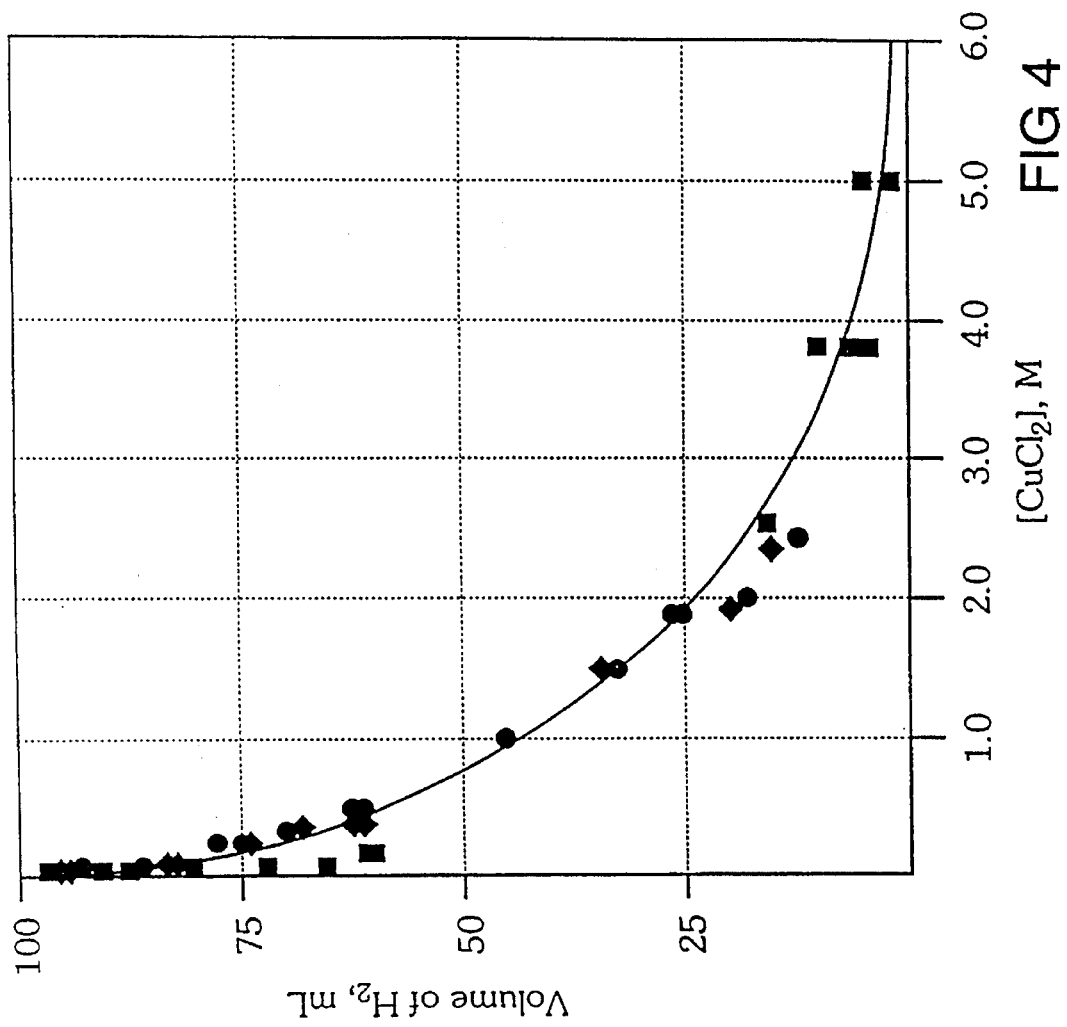
FIG. 4 depicts the influence of increasing concentrations of cupric chloride with respect to the volume of $H_2$ produced.

Plots of the influence of increasing scavenger concentration are shown in FIGS. 3 and 4 for cupric chloride. The higher the concentration, the greater the suppression. The fact that high concentrations are needed and that almost all the precursors are scavengeable at very high cupric concentration indicates that the precursors are not uniformly distributed in the solution and must exist for a short time near the Mg-water interface. The relative effectiveness of each scavenger can be estimated from plots such as FIG. 4, by defining the concentration at which only 37% (~1/e×100) of precursors remains unscavenged; it is referred to hereinafter as $C_{37}$.

Figure 5:
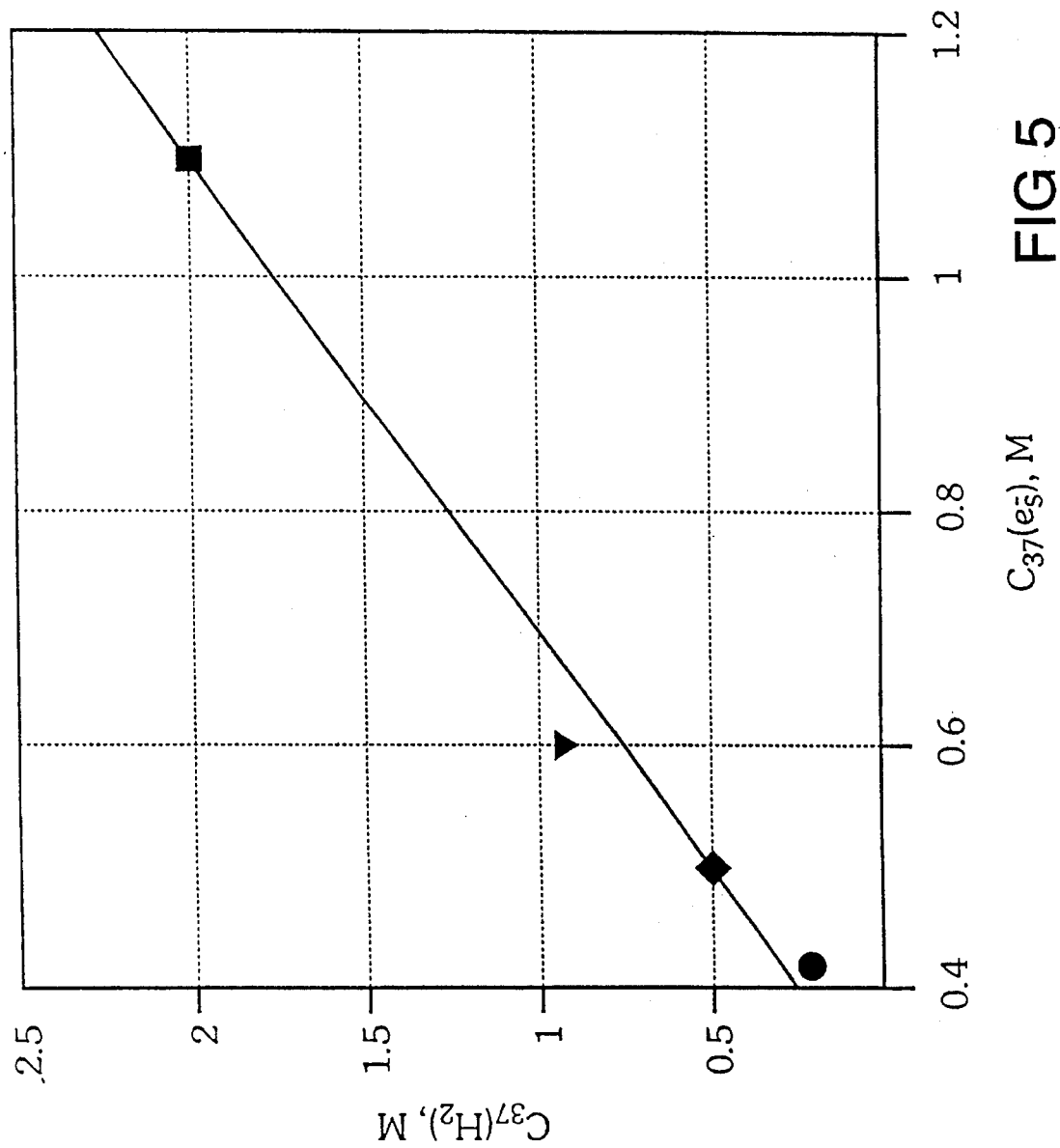
FIG. 5 depicts a comparison of $C_{37}$ as a scavenger.

While the effectiveness of a scavenger to suppress dihydrogen formation is consistent with high reactivity towards solvated electrons, a comparison of $C_{37}$ values with other data in the literature indicates that scavenging of the precursor of the unsolvated electron could also be involved. Such a comparison is shown in FIG. 5 in which is plotted the $C_{37}$ for dihydrogen suppression ($C_{37}(H_2)$) by four scavengers used in these studies against the $C_{37}$ for suppressing the formation of solvated electrons ($C_{37}(e^-)$) by the same scavengers used in experiments involving the irradiation of aqueous solutions (Duplàtre and Jonah, 1985). The scavengers included are nitrate, trichloroacetate, persulfate, and maleate ions. The regression line is linear but does not go through the origin. In the irradiation study, direct measurements were made on the transient formation of the solvated electron, $e^-_{aq}$, first without and then with scavenger at increasing concentrations. The suppression in the $e^-_{aq}$ yield was attributed to the scavenging of the unsolvated precursor, denoted $e^-_{pre}$. The reasonably good correlation of $C_{37}(H_2)$ with $C_{37}(e^-)$ is consistent with the scavenger reacting in part with $e^-_{pre}$ as well as with the fully solvated $e^-_{aq}$. These scavenger results taken together indicate that the reaction of Mg with water to produce dihydrogen gas involves, either sequentially or concurrently, the short-lived but scavengeable entities: $e^-_{pre}$, $e^-_{aq}$, and H.. An earlier study on the reaction of sodium amalgam with water (Hughes and Roach, 1966) and another on three reactions with water in which dihydrogen is formed, namely, sodium amalgam, electrolysis, and cationic reduction (Walker, 1960), provided credible evidence for the involvement of $e^-_{aq}$.

The fact that in the reaction of Mg particles with water high scavenger concentrations are needed to achieve suppression indicates that the electrons exist transiently only at or near the magnesium surface, a few of which diffuse away from the surface into the bulk of the solution. Consequently, it requires high concentrations to have scavenger molecules near the surface that is reactive and accessible to water molecules. Suppression of dihydrogen formation by a scavenger would depend not only on its reactivity with the electrons and on its concentration, but also on the distribution of electrons as a function of distance from the magnesium surface; such a distribution should fall off sharply.

Since the reactions involving the magnesium-iron powder and these solutions generate considerably more heat than the reaction between magnesium-iron and water, the compositions described here are based on reaction with 4 g of the powder instead of with the 8 g normally found in a typical FRH pad. All of these compositions are applicable to heater applications involving a dry mixture of reactants in either a molded pad (FIG. 6) or a recessed compartment (FIG. 7) and either water or a solution, preprepared or made just prior to use, containing one or more suppressants.

Example 1

Cupric Chloride, Buffered

For reaction with 4 g of blended magnesium-iron powder (0.95 mole fraction Mg), 51 g of cupric chloride dihydrate, 7.7 g of citric acid, and 34.2 g of sodium citrate are either dissolved in 100 ml of water or added to the powder for subsequent dissolution in 100 ml of water, so that the $[Cu^{2+}]$ will be 3M, $[Cl^-]$ will be 6M, and the pH will be 2. No sodium chloride is needed. The suppressant and buffering agent can be stored separately as a solid mixture, dissolved when needed, and then added as a solution to activate the reaction. Once all reactants are in contact in this two-phase (solid-solution) system, the exothermic reaction proceeds on a sustained basis without generating significant amounts of dihydrogen, because of scavenging by $Cu^{2+}$, the net reaction being:

$$Mg+2Cu^{2+} \rightarrow Mg^{2+}+2Cu^+$$

Example 2

Cupric Chloride and Trichloroacetate

For reaction with 4 g of the magnesium-iron powder, 25.5 g of cupric chloride dihydrate and 34.2 g of sodium trichloroacetate are either dissolved in 100 mL of water or added to the powder for subsequent dissolution in 100 mL of water, so that the $[Cu^{2+}]$ will be 1.5M, the $[Cl^-]$ will be 3M, the [trichloroacetic acid+trichloroacetate] will be 1.5M, and the pH will be 3. No sodium chloride is needed, and the other solids can be separately stored for dissolution when needed. The trichloroacetate serves both as a suppressant and as a buffering agent. Once all reactants are in contact, the reaction proceeds on a sustained basis without generating significant amounts of dihydrogen not only because of the net reaction given in Example 1, but because of the additional net reaction:

$$Mg+2Cl_3CCOO^- \rightarrow 2Cl^-+(Cl_2CCOO^-)_2+Mg^{2+}$$

Since additional chloride is formed during the course of the reaction, the rate would tend to increase as the reaction proceeds.

Example 3

Cupric Chloride, Unbuffered

For reaction with 4 g of blended magnesium-iron powder, 25.5 g of cupric chloride dihydrate is either dissolved in 200 mL of water or added to the powder for subsequent dissolution in 200 mL of water, so that the $[Cu^{2+}]$ will be 1.5M, the $[Cl^-]$ will be 3M, and the pH will be about 1.5. No sodium chloride is needed, and the cupric chloride dihydrate can be separately stored for dissolution when needed. Once the two-phase system is established, the exothermic reaction will proceed rapidly (because of the low pH) without generating significant amounts of hydrogen, because of the reaction described in Example 1. Although the solution in this example is not as concentrated in $Cu^{2+}$ as in Example 1, it is adequate and contains the same number of moles of $Cu^{2+}$.

Example 4

Peroxydisulfate, Buffered and Unbuffered

For reaction with 4 g of blended magnesium-iron powder, 36 g of sodium peroxydisulfate, 2.9 g of sodium chloride, 14.2 g of sodium sulfate, and 1.2 g of sodium bisulfate are either added to the powder or separately stored for subsequent dissolution in 100 mL of water, so that the $[S_2O_8^{2-}]$ will be 3M, the $[Cl^-]$ will be 2M, and the pH will be 3. Preprepared solutions of the peroxydisulfate cannot be used in this case because of instability. The sulfate and bisulfate salts can be omitted, but the solution would then be unbuffered, resulting in a possibly slower reaction and excessive $Mg(OH)_2$ being precipitated. In either case, buffered or unbuffered, the exothermic reaction proceeds on a sustained basis without generating a significant amount of dihydrogen, because of scavenging by $S_2O_8^{2-}$, the net reaction being:

$$Mg+S_2O_8^{2-} \rightarrow 2SO_4^{2-}+Mg^{2+}$$

Some thermally-induced decomposition of the peroxydisulfate will also occur because the solution becomes hot.

Example 5

Pyruvate, Unbuffered

For reaction with 4 g of blended magnesium-iron powder, 19.5 g of sodium pyruvate and 2.9 g of sodium chloride are either dissolved in water or added to the powder for subsequent dissolution in 100 mL of water, so that the [pyruvate] will be 1.5M, the $[Cl^-]$ will be 2M, and the pH will be about 4. The solids can be separately stored for subsequent dissolution when needed. Once all the reactants are in contact, the reaction proceeds on a sustained basis without generating significant amounts of dihydrogen, because of scavenging by the pyruvate, the net reaction being:

$$2H_2O+Mg+CH_3COCOO^- \rightarrow Mg^{2+}+CH_3CHOHCOO^-+2OH^-$$

Exemplary Calculations of Heat From Exothermic Reactions According to The Present Invention The following thermochemical calculations provide guidelines for comparing the relative heat output for different scavengers that suppress $H_2$ formation. The calculated values are for 1 mole of magnesium reacted, and for each reactant in its standard state. The heat of reaction is calculated from standard heats of formation, $\Delta H_f^o(298K)$ (Lide, 1990). For the trichloroacetic acid reaction, thermal data on the organic product are not available, and the standard heat of formation of the product was estimated (Benson, 1972).

1. Mg + H$_2$O: control reaction, no H$_2$ suppression.
$$Mg = Mg^{2+} + 2e^-_{aq}$$
$$2e^-_{aq} + 2H_2O = H_2 + 2OH^-$$
$$Mg^{2+} + 2OH^- = Mg(OH)_2$$

Net reaction: Mg + 2H$_2$O = Mg(OH)$_2$ + H$_2$
Heat of reaction: −84.36 kcal mol$^{-1}$ 2. Mg + CuCl$_2$: mildly acidic solution, excess CuCl$_2$, Cu$^0$ production, H$_2$ suppression.
$$CuCl_2 = Cu^{2+} + 2Cl^-$$
$$Mg = Mg^{2+} + 2e^-_{aq}$$
$$2e^-_{aq} + 2H^+ = 2H^·$$
$$H^· + Cu^{2+} = Cu^+ + H^+$$
$$H^·Cu^+ = Cu^0 + H^+$$

Net reaction: Mg + CuCl$_2$ = Mg$^{2+}$ + 2Cl$^-$ + Cu$^0$
Heat of reaction: −139.11 kcal mol$^{-1}$ 3: Mg + NaNO$_3$: mildly acidic solution, excess NaNO$_3$, HNO$_2$ production, H$_2$ suppression.
$$2NaNO_3 = 2Na^+ + 2NO_3^-$$
$$2Mg + 2H^+ = 2Mg^{2+} + 2e^-_{aq} + 2H^·$$
$$NO_3^- + 3H^+ + 2e^-_{aq} = HNO_2 + H_2O$$
$$NO_3^- + 2H^· + H^+ = HNO_2 + H_2O$$

Net reaction: Mg + NaNO$_3$ + 3H$^+$ = Mg$^{2+}$ +Na$^+$ + HNO$_2$ + H$_2$O
Heat of reaction: −263.75 kcal mol$^{-1}$ 4. Mg + trichloroacetic acid (Cl$_3$CCOOH), H$_2$ suppression.
$$Mg = Mg^{2+} + 2e^-_{aq}$$
$$2e^-_{aq} + 2Cl_3CCOOH = 2Cl_2CCOOH$$
$$2Cl_2CCOOH = (Cl_2CCOOH)_2$$

Net reaction: Mg + 2Cl$_3$CCOOH = Mg$^{2+}$ + 2Cl$^-$ + (Cl$_2$CCOOH)$_2$
Heat of reaction: −172.5 kcal mol$^{-1}$ Having described the various chemical reactions that enable the practice of the present invention, it is now possible to discuss apparatus which enable the invention to be practiced safely and effectively. The basic elements required to practice this method of chemical heating are metallic reductants in a form with high surface area (such as powders, turnings, ribbons or wires) which may be provided alone or disbursed in an inert porous matrix and which further can be configured as a flat pad, sphere, a cylinder, a block or irregularly shaped form which permits reaction upon contact with water or water solutions.

Also required are chemicals that act as promoters of the reduction reaction between metal and water that further function through direct contact with the metal reductants and may be configured as particles, fine wire strips, flat ribbons, or a coating which is physically deposited or chemically generated. Finally, it is necessary to provide a catalyst, such as sodium chloride or acid, to prevent the formation of protective hydroxide or oxide coating of the metal, and create channels through the coating (or remove the coating completely) thereby allowing access of water to the metal or amalgam.

Critical to the suppression of hydrogen, however, are the scavengers as have been described above. Many of the chemicals producing heat upon reactions in solution, including those with these reductants and catalysts, have been known. It is the use of the scavengers to suppress the creation of hydrogen gas and avoid the release of dangerous dihydrogen gas that primarily distinguishes this invention from the prior art and advances the state of the art. Accordingly, the combinations, methods, and apparatus of the present invention will always incorporate structures or solutions including scavengers as taught herein.

Figure 6:
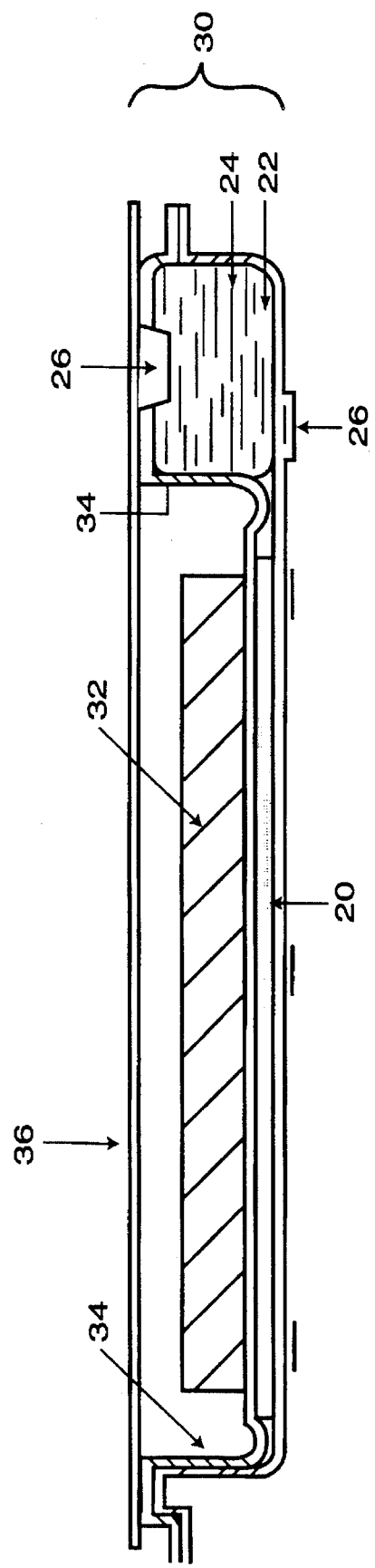
FIG. 6 depicts a cross-section of an apparatus useful in exploiting the chemical principles of the present invention to heat a container with a single serving of food.

The apparatus of the preferred embodiment of the invention comprises the solid chemicals either molded into a pad or maintained loosely in a container compartment and the water or reaction-initiating solution either integrally contained or maintained separately. Alternative embodiments are shown in FIGS. 6 and 7, each of which is made according to the principles of the present invention. While FIGS. 6 and 7 depict certain apparatus appropriate for use with the present invention, certain comments should be made in order to define the purpose of the present invention. Such apparatus are, but for the inventor's present innovations with respect to the incorporation of scavengers and unique selections of reductants, promoters, and catalysts, presently known in the art. It is not the intention herein to claim as invention the mechanical configuration, except as may incorporate the materials as are selected and configured for use herein. Such configurations and materials can indeed be seen to produce new and substantially improved results and offer substantial advantages over such similar heaters taught in the prior art.

For use with an individual serving of food, the self-contained heater system depicted in FIG. 6 may be used. It contains both the chemical heater pad (20) and the activating water or solution (22) as integral components. The pad (20) is a molded, porous high density polyethylene matrix in which are embedded the Mg/Fe particles, the suppressants, and buffering agents. The water or solution of sodium chloride (22) is contained in a sealed polymeric bag (24) made with a tab (26) that, when pulled, tears open the bag (24). Both the pad (20) and the bag (24) are contained within the outer tray (28) of a nested, two-tray arrangement (30). The food to be heated (32) is contained within the inner tray (34), which is sealed with an aluminum foil lid (36).

By the use of a variety of processing techniques, 15 including thermal and radiation treatment, the food (32) is preserved for room temperature storage. Such processing techniques are well known in the food preservation art and are beyond the spirit and scope of the present invention. Just prior to use, the tab (26) is pulled releasing the water or solution (22), which then comes in contact with the pad (20) and its reactive contents. The soluble buffering agents and suppressants dissolve, the magnesium reacts with the water, and heat is generated without substantial amounts of dihydrogen gas being formed. Within ten minutes, the food becomes hot. This same arrangement and procedure can be used in any scale-up extension to multiple meals in an appropriate container or box.

For use with a multi-serving food package, such as a flexibly-packaged pouch with 12 or more servings, the heater system depicted in FIG. 7 may be used. It contains the heater chemicals in recessed compartments (50, 51, 52) of a molded, rigid polymeric form (58), sized to match the food pouch (72) and the container (70) holding the pouch. Of the solid chemicals required, the Mg/Fe particles and the sodium chloride are maintained in these compartments (50, 51, 52) and constrained from spilling out by a porous scrim material (59) sealed to the form (58), while the suppressants and buffering agent are maintained separately.

The compartments (50, 51, 52) and the porous scrim sealed to the form (58) are such that the compartments can be broken off from one another so as to have as little as one or as many compartments (50, 51, 52) as desired in an integral form. The porous scrim (59) sealed to the form (58) will, accordingly, tear off with portions of the form (58). The porous scrim (59) is also made of a material which will hold the reductant, catalyst, promoter, and scavenger within the compartments (50, 51, 52), but permit the solution, or solvent, to pass through.

This form (58) may then be placed within a container (70) capable of holding heated water as depicted in FIG. 7 so that the porous scrim (59) rests upon the lower surface of this container (70). The container (70) may then be filled with a solution (71) up to the level of the upper surface (54) of the form (58). The solution (71) will then pass through the scrim (59) and initiate the desired heating reaction. A package of food (72) may be placed upon the upper surface (54) of the form (58) and be heated without substantial amounts of dihydrogen being formed. Depending on the size of the pouch and the container design, the food becomes hot in a relatively short time of between 10–30 minutes. This same arrangement and procedure can be used in a scaled-down version involving a single-serving pouched food.

There are a variety of chemical heating apparatus available, many others of which are presently in a form for effective use with the invention as presently taught. Others may be capable of adaptation for use with the present invention with little modification or with only reasonable modification. Essentially, what is required is the configurations of reductants, promoters, scavengers, and catalysts in a form to promote rapid exposure to a solvent. There must also be a series of containers and subcontainers allowing the solution to be isolated from the other elements until the appropriate time, containment of the solution and heat, and transmission or communication between the resulting heat and the items to be heated. Furthermore, the principles of the present invention may give rise to the creation of entirely new apparatus, all of which are intended to be included within the spirit and scope of the present invention.

Further modification and variation can be made to the disclosed embodiments without departing from the subject and spirit of the invention as defined in the following claims. Such modifications and variations, as included within the scope of these claims, are meant to be considered part of the invention as described.

What is claimed is:

1. A chemical combination that generates heat for heating small portions of matter, such as water or some consumable rations, without the simultaneous production of dihydrogen gas and that contains metallic reductant, promoters, catalysts, a scavenger of dihydrogen precursors, and water both as a reactant and as medium for the reaction, the combination comprising;

metallic or metal-like reductants with sufficiently high reduction potentials to reduce water;

promoters with the capacity to promote the reaction of said reductants and make them kinetically favorable;

catalysts with the capacity to channelize or remove the reaction byproduct coating the metallic reductant and blocking the penetration of water to the reactive metal surface;

scavengers of either electrons or hydrogen-atoms, or both, that are highly reactive to said precursors of dihydrogen, and, in the case of organic scavenger compounds with reactive groups that have high electron affinity, that are sufficiently miscible or soluble in water to reach concentrations high enough to compete kinetically with the pathways for reactions of the precursors that lead to dihydrogen, such scavengers further being characterized by high rate constants for reaction with unsolvated and solvated electrons and with H-atoms; and water and water solutions for stabilizing the electrons from the reductants, to serve as the source of hydrogen atoms, and to serve as the medium for transporting the dissolved solutes to the interface with the metal near where the scavenging primarily occurs.

2. The chemical combination for generating heat described in claim 1 in which said metallic or metal-like reductants include one or a combination of Mg, Mn, Zn, Cd, Ni, Na, Li, and their amalgams.

3. The chemical combination for generating heat described in claim 1 in which said promoters for promoting the reaction of the reductant and making it kinetically favorable are selected from one or a combination of Fe, Co, Ni, and V.

4. The chemical combination for generating heat described in claim 1 in which said catalyst for channelizing or removing reaction byproduct which may coat the metallic reductant and block the penetration of water to the reactant metal surface may be either chloride ion or hydrogen ion.

5. The chemical combination for generating heat described in claim 1 in which said scavengers of electrons characterized by high rate constants for reaction with unsolvated and solvated electrons and with H-atoms are selected from one or a combination of peroxydisulfate, periodate, bromate, nitrate, nitrite, cupric, ferricyanide, chloroacetate, trichloroacetate, acetamide, acetone, benzoate, and maleate.

6. Apparatus for chemically generating heat without releasing dihydrogen gas, the apparatus comprising;

metallic reductants in a form with a high surface Area, such form being selected from one or a combination of powders, turnings, ribbons, or wires, alone or dispersed in an inert porous matrix, and configured as a flat pad, sphere, cylinder, block, or an irregularly shaped form that reacts upon contact with water or water solutions;

promoters of the reduction reaction between metal and water positioned for selectively timed contact with the metal and are further configured to promote the reaction of said reductants and make them kinetically favorable;

catalysts which are adapted and positioned to prevent the formation of the protective hydroxide or oxide coating of the metal, create channels through the coating, or remove the coating completely, thereby allowing access of the water to the metal or amalgam;

scavengers of either electrons or hydrogen-atoms, or both that are highly reactive to said precursors of dihydrogen, and, in the case of organic scavenger compounds with reactive groups that have high electron affinity, that are sufficiently miscible or soluble in water to reach concentrations high enough to compete kinetically with the pathways for reactions of the precursors that lead to dihydrogen, such scavengers further being characterized by high rate constants for reaction with unsolvated and solvated electrons and with H-atoms;

water and water solutions for stabilizing the electrons from the reductants, to serve as the source of hydrogen atoms, and to serve as the medium for transporting the dissolved solutes to the interface with the metal near where the scavenging primarily occurs;

an outer container with releasable seal, said outer container further enclosing an inner container, within which may be housed a separate heating compartment, said heating compartment further enclosing said metallic reductant, promoter, catalyst, and scavenger, and a first inner container which is further adapted with a releasably sealed port such that said port may opened to release said water or solution to make contact and react with the chemicals within said heating compartment;

said outer container further being adapted to withstand and retain the heat formed by a heating chemical reaction which may be created by the said release of said water or other solution and a second inner container which is adapted with means to allow the exposure of the interior of said heating compartment to said solution and to contain a heat generating reaction which may occur within said heating compartment.

7. The apparatus for chemically generating heat described in claim 6 in which said metallic or metal-like reductants are selected from one or a combination of Mg, Mn, Zn, Cd, Ni, Na, Li and their amalgams;

said promoters are selected from one or a combination of Fe, Co, Ni, or V;

in which said channelizing or reaction byproduct removing catalyst may be either chloride ion or hydrogen ion; and in which said scavengers may be selected from one or a combination of peroxydisulfate, periodate, bromate, nitrate, nitrite, cupric, ferricyanide, chloroacetate, trichloroacetate, acetamide, acetone, benzoate, and maleate.

8. Apparatus for chemically generating heat without releasing dihydrogen gas described in either claims 6 or 7 in which the outer container of said apparatus further comprises an outer tray with removable lid, said outer tray further enclosing an inner tray compartment, within which may be housed a portion of food to be heated;

said outer tray further enclosing said first inner container which further comprises a separate heating compartment, said heating compartment further enclosing said metallic reductant in said flat pad, sphere, cylinder, block, or other irregularly shaped form;

said second inner container further comprising a bag or pouch with water or other heating solution, said bag or pouch further adapted with a releasably sealed port such that said port may opened to release said water or solution to make contact and react with the chemicals within said heating compartment;

said outer tray further being adapted to withstand and retain the heat formed by a heating chemical reaction which may be created by the said release of said water or other solution and said inner tray being further adapted to withstand and conduct said heat to heat said portion of food and said lid being further adapted for removal to expose said heated food for consumption or serving.

9. A method for chemically heating foodstuffs or similar material without forming explosive amounts of dihydrogen gas, the method comprising the steps of;

placing an appropriate metallic reductant into a form with a high surface area to volume ratio, which may be in the form of powder, strips, ribbons, wire, or other irregular shape, so that a substantial portion of such material may be contemporaneously exposed to the surrounding environment;

placing a chemical promoter into a form with a high surface area to volume ratio, which may be in the form of powder, strips, ribbons, wire, or other irregular shape, so that a substantial portion of such material may be contemporaneously exposed to the surrounding environment;

selecting a catalyst for channelizing and otherwise expediting a reaction between such reductant, promoter, and an appropriate chemical solvent which may be placed either in solution or which may be exposed to said reductant and promoter without reaction and which will, when exposed to said reductant and promoter in the presence of an appropriate solvent, generate heat;

selecting a scavenger of either electrons or hydrogen-atoms, or both, said scavenger further being highly reactive to said precursors of dihydrogen, and, in the case of organic scavenger compounds with reactive groups that have high electron affinity, that are sufficiently miscible or soluble in water to reach concentrations high enough to compete kinetically with the pathways for reactions of the precursors that lead to dihydrogen, such scavengers further being characterized by high rate constants for reaction with unsolvated and solvated electrons and with H-atoms which will react with and neutralize the release of aqueous or free dihydrogen which may be released from said heat producing chemical reaction;

enclosing such reductant, promoter, catalyst, scavenger, and solution within a container with food or other material to be heated; and combining the said reductant, promoter, catalyst, scavenger, and solution in a reaction to produce heat while preventing the release of dihydrogen gas.

10. The method for chemically heating foodstuffs or similar material without forming explosive amounts of dihydrogen gas described in claim 9, in which the step of combining the said reductant, promoter, catalyst, scavenger, and solution comprises the additional steps of;

placing said reductant, promoter, catalyst, and scavenger together; and exposing said combination to said solution.

11. The method for chemically heating foodstuffs or similar material without forming explosive amounts of dihydrogen gas described in claim 9, in which the step of combining the said reductant, promoter, catalyst, scavenger, and solution comprises the additional steps of;

placing said reductant, promoter, and catalyst together;

calculating the concentration of scavenger to solvent solution required to suppress dihydrogen gas in the presence of the desired quantity of said reductant, promoter, and catalyst;

dissolving said scavenger within said solvent; and exposing said combined reductant, promoter, and catalyst to said solution of said solvent and said catalyst.

12. The method for chemically heating foodstuffs or similar material without forming explosive amounts of dihydrogen gas described in claim 9, in which the step of combining the said reductant, promoter, catalyst, scavenger, and solution comprises the additional steps of;

placing said reductant, and promoter together;

calculating the concentration of scavenger in a solution required to suppress dihydrogen gas in the presence of the desired quantity of said reductant, promoter, and catalyst;

dissolving said scavenger within said solvent; and exposing said combined reductant and promoter and catalyst to said solution of said solvent and said scavenger.

13. The methods for chemically heating foodstuffs or similar material without forming explosive amounts of dihydrogen gas taught in either claims 9, 10, 11, or 12 in which said metallic or metal-like reductants include one or a combination of Mg, Mn, Zn, Cd, Ni, Na, Li, and their amalgams;

in which said promoters for promoting the reaction of the reductant and making it kinetically favorable are selected from one or a combination of Fe, Co, Ni, and V; and in which said catalyst for channelizing or removing reaction byproduct which may coat the metallic reductant and blocking the penetration water to the reactant metal surface may be either chloride ion or hydrogen ion.

14. Apparatus for chemically generating heat without releasing dihydrogen gas described in either claims 6 or 7 in which said outer container may be opened at the top, is adapted to contain said solvent and to withstand the generation of sufficient heat to heat food, and has a generally planar lower surface;

in which said heating compartment further comprises a rigid polymeric form adapted with two or more cells, each said cell further comprising a quantity of said reductant, promoter, catalyst, and scavenger;

each said cell further being closed with a porous scrim adapted to hold said reductant, promoter, catalyst, and scavenger within said cell, but to permit the passage of a solvent through said scrim and into said cell; and said polymeric form adapted to be broken away between cells and said scrim adapted to break away with said cell without loss of any of said reductant, promoter, catalyst, or scavenger, in order to select a desired number of one or more such cells to rest upon said planar lower surface with said porous scrim resting against said lower planar surface.

* * * * *